No. 670,957.  
F. I. JOHNSON.  
CRANK HANGER FOR BICYCLES.  
Application filed Jan. 24, 1900.  
Patented Apr. 2, 1901.

(No Model.)  
3 Sheets—Sheet 1.

Witnesses:  
Harry M. Rugg.  
Ava T. Murphy.

Inventor:  
Frederic I. Johnson  
By Rufus B. Fowler  
Attorney

No. 670,957. Patented Apr. 2, 1901.
F. I. JOHNSON.
CRANK HANGER FOR BICYCLES.
(Application filed Jan. 24, 1900.)
(No Model.) 3 Sheets—Sheet 2.

Witnesses
Harry M. Rugg.
Ava T. Murphy.

Inventor
Frederic I. Johnson
By Attorney
Rufus B. Fowle

No. 670,957. Patented Apr. 2, 1901.
F. I. JOHNSON.
CRANK HANGER FOR BICYCLES.
Application filed Jan. 24, 1900.

(No Model.) 3 Sheets—Sheet 3.

Witnesses:
Harry M. Rugg.
Ava T. Murphy.

Inventor.
Frederic I. Johnson
By Attorney.
Rufus B. Fowler

UNITED STATES PATENT OFFICE.

FREDERIC IVER JOHNSON, OF FITCHBURG, MASSACHUSETTS.

CRANK-HANGER FOR BICYCLES.

SPECIFICATION forming part of Letters Patent No. 670,957, dated April 2, 1901.

Application filed January 24, 1900. Serial No. 2,606. (No model.)

*To all whom it may concern:*

Be it known that I, FREDERIC IVER JOHNSON, a citizen of the United States, residing at Fitchburg, in the county of Worcester and Commonwealth of Massachusetts, have invented a new and useful Improvement in Crank-Hangers for Bicycles, of which the following is a specification, accompanied by drawings forming a part of the same, in which—

Figure 1:
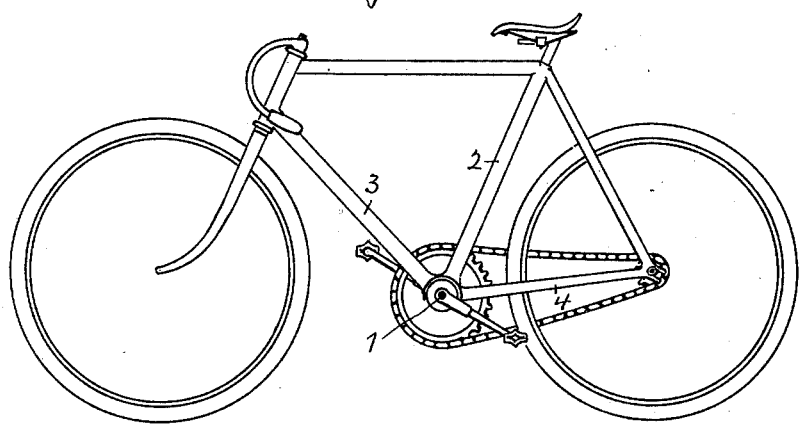
Figure 2:
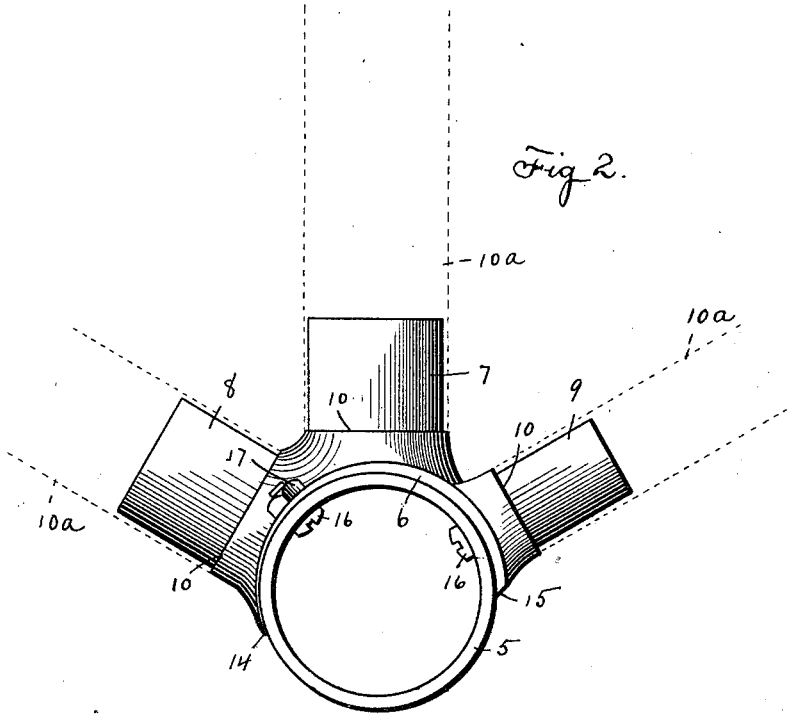
Figure 3:
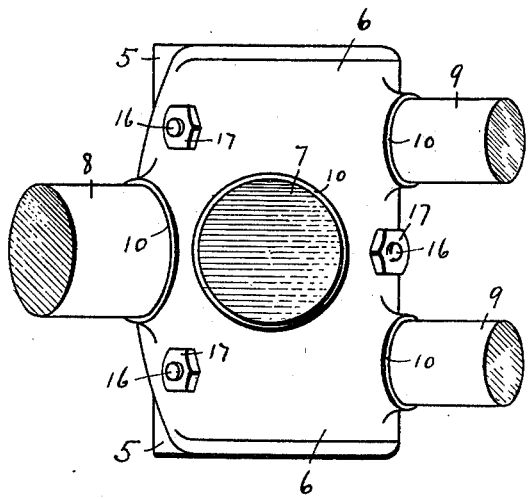
Figure 4:
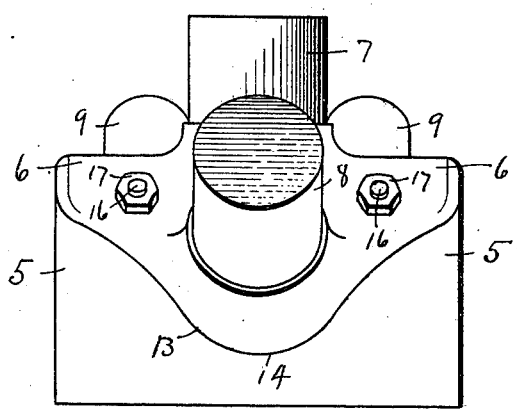
Figure 5:
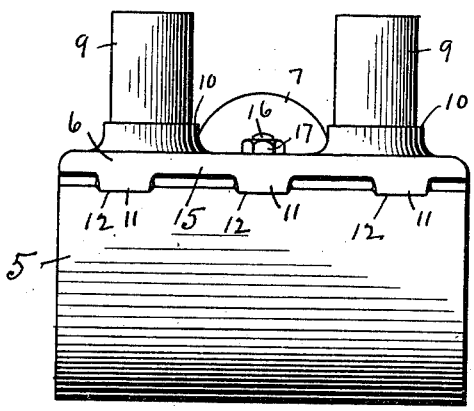
Figure 6:
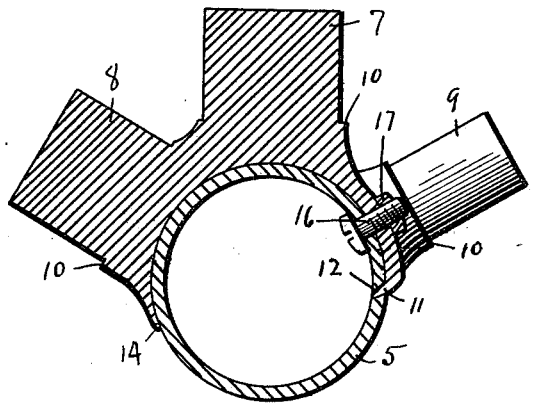
Figure 7:
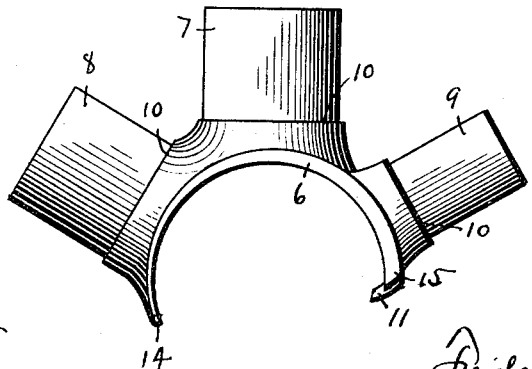

Figure 1 represents a side elevation of a bicycle embodying my invention. Fig. 2 represents in side view, on a larger scale, that portion of the bicycle-frame known as the "crank-hanger" or "bracket." Figs. 3, 4, and 5 are respectively top, front, and rear views of the crank-hanger or bracket. Fig. 6 is a central vertical sectional view of the same; and Fig. 7 represents that portion of my improved crank-hanger which is permanently attached to the framework of the bicycle and to which a transverse barrel is removably attached, containing the usual ball-bearings of the crank-shaft.

Similar reference-figures refer to similar parts in the different views.

My invention relates to that portion of a bicycle-frame commonly known as the "crank-hanger" which contains the bearings for the crank-shaft; and it consists in the construction and arrangement of parts, as hereinafter described, and pointed out in the annexed claims.

Referring to Fig. 1 of the drawings, 1 denotes the crank-shaft of a bicycle journaled in bearings which are contained in a crank-hanger or bracket held in the framework of the bicycle and from which diverge the seat-post tube 2, the lower frame-tube 3, and the rear forks 4 in the usual method of bicycle construction. The bicycle-frame is usually constructed with a transverse barrel forming the crank-hanger or bracket as an integral part of the framework and with the diverging tubes of the frame brazed thereto. By my improved method of constructing the crank-hanger of a bicycle instead of brazing the tubular framework directly to the transverse barrel I detachably connect the barrel, in which are fitted the ball-cups of the crank-bearings in the usual and well-known manner, to a curved plate provided with prongs, to which are brazed the ends of the tubes constituting the framework of the bicycle. The curved plate to which the tubular framework is brazed is preferably made by drop-forging, and consists of a plate curved or bent in the arc of a circle corresponding to the outer periphery of the transverse barrel.

Referring to the accompanying drawings, 5 denotes a short piece of tubing constituting a transverse barrel, in which are fitted in the usual and well-known manner suitable bearings for the crank-shaft, said bearings not being represented in the drawings as their method of construction will be well understood. The sleeve or barrel 5 fits the concave surface of a curved plate 6, which is provided with a short prong 7 to receive the end of a seat-post tube 2, a prong 8 to receive the end of the lower frame-tube 3, and a pair of prongs 9 9 to receive the rear-fork tubes 4 of the bicycle-frame. The prongs 7, 8, and 9 are provided with shoulders 10, against which the connected tubes of the bicycle-frame abut, as shown by the broken lines 10ª, Fig. 2, and the ends of the tubes 2, 3, and 4 are securely brazed to the prongs of the curved plate 6 in the usual and well-known manner. The rear edge of the curved plate 6 is provided with prongs 11, which are turned or bent inwardly and enter mortises 12 in the barrel 5. The opposite edge of the plate 6 is curved, as at 13, and is reduced in thickness, so as to form a thin edge capable of being compressed against the periphery of the barrel 5. The extreme width of the plate from the tip 14 of the curved edge 13 to the rear edge 15 of the plate is preferably slightly more than half the circumference of the barrel 5, and the plate 6 may be made capable of being sprung open for the reception of the barrel.

The curved plate 6 and its projecting prongs 7, 8, and 9 are preferably forged in a single piece, with the prongs either solid, as shown in the drawings, or bored out in order to reduce their weight.

The barrel 5, provided with mortises 12, fitting the inwardly-turned prongs 11 of the curved plate 6, is pressed into place and attached to the curved plate by bolts 16 and nuts 17, thereby drawing the barrel into close contact with the curved plate 6.

My improved method of constructing a crank-hanger or bracket of a bicycle enables the ball cups or bearings of the crank to be completely fitted in the barrel when detached from the frame and the brazed framework to be completed before the hanger is applied thereto, so that the barrel or sleeve 5, which is usually provided with screw-threaded ends to receive the ball-cups, is not subjected to the intense heat required to braze the framework.

What I claim as my invention, and desire to secure by Letters Patent, is—

1. The combination with the tubular framework of a bicycle, of a plate curved in the arc of a circle and arranged transversely to the frame and provided with prongs turned inwardly, or toward the concave side of said plate, a barrel fitting the concave side of the curved plate and attached thereto and having mortises to receive said prongs.

2. The combination with the tubular portions 2, 3 and 4 of a bicycle-frame, of a plate 5 curved in the arc of a circle and brazed or otherwise attached to the tubular portions of the frame, prongs 11 projecting from one edge of said curved plate, a barrel to receive the crank-shaft and having mortises 12 to receive the prongs 11 and bolts by which said barrel is attached to said curved plate, substantially as described.

In testimony whereof I have hereunto affixed my signature this 20th day of January, 1900.

FREDERIC IVER JOHNSON.

Witnesses:
WALTER U. JOHNSON,
J. TORELL JOHNSON.